United States Patent
Bloomfield et al.

[11] 3,839,091
[45] Oct. 1, 1974

[54] REGENERATIVE FUEL CELL

[75] Inventors: David P. Bloomfield, West Hartford; Neil A. Hassett, East Hartford; James K. Stedman, Glastonburg, all of Conn.

[73] Assignee: United Aircraft Corporation, East Hartford, Conn.

[22] Filed: Nov. 10, 1972

[21] Appl. No.: 306,255

Related U.S. Application Data

[63] Continuation of Ser. No. 51,902, July 2, 1970, abandoned.

[52] U.S. Cl. ............................................. 136/86 R
[51] Int. Cl. ......................................... H01m 33/00
[58] Field of Search ....................... 136/86 S, 86 R

[56] References Cited
UNITED STATES PATENTS

| | | | |
|---|---|---|---|
| 3,507,704 | 4/1970 | Webb | 136/86 R |
| 3,554,809 | 1/1971 | Craft | 136/86 R |

Primary Examiner—Winston A. Douglas
Assistant Examiner—H. A. Feeley
Attorney, Agent, or Firm—Stephen E. Revis

[57] ABSTRACT

A regenerative fuel cell assembly is provided in which a fuel cell is integrated with an electrolysis cell; the fuel cell assembly, including a water storage matrix, is disposed adjacent to the electrolysis cell assembly, which also includes a water storage matrix, and spaced therefrom by a hydrogen gas passage.

12 Claims, 5 Drawing Figures

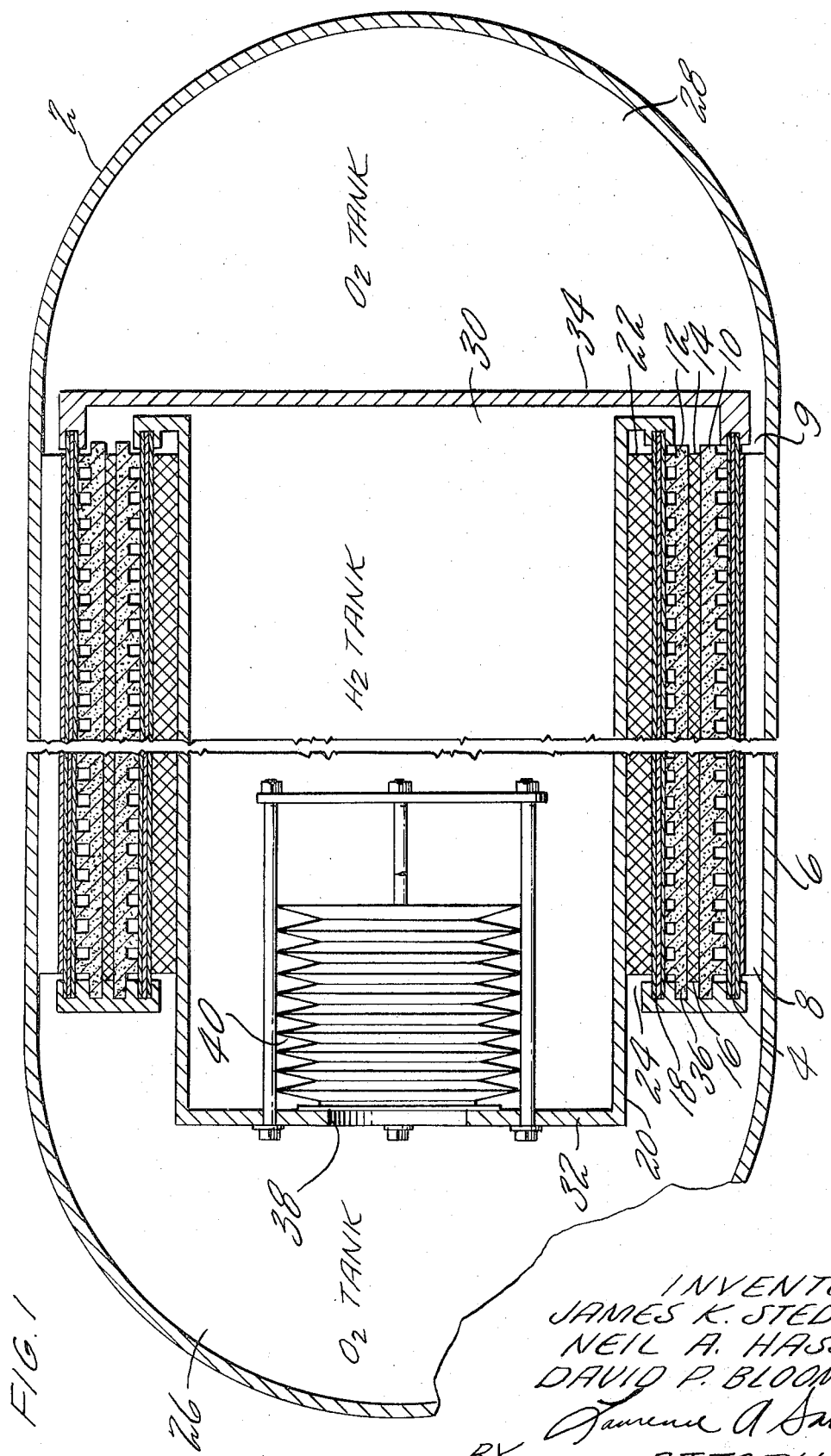

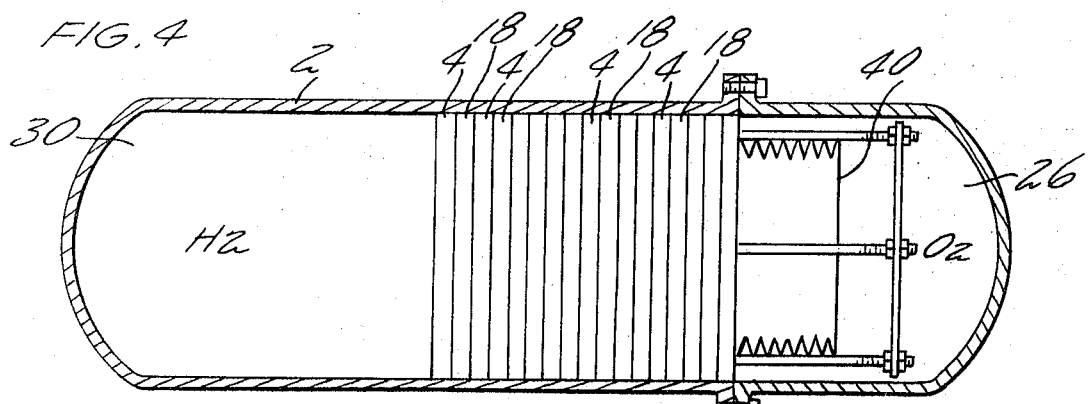
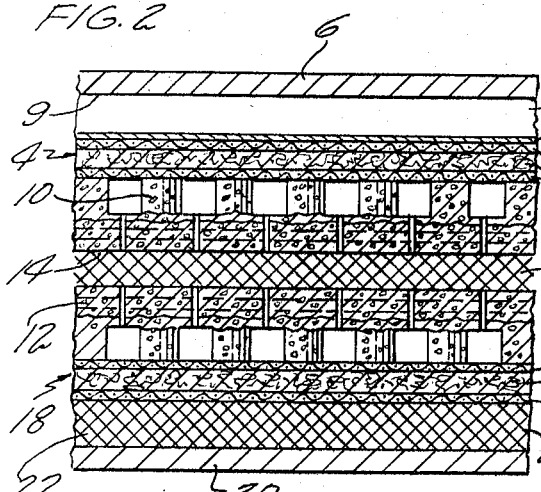
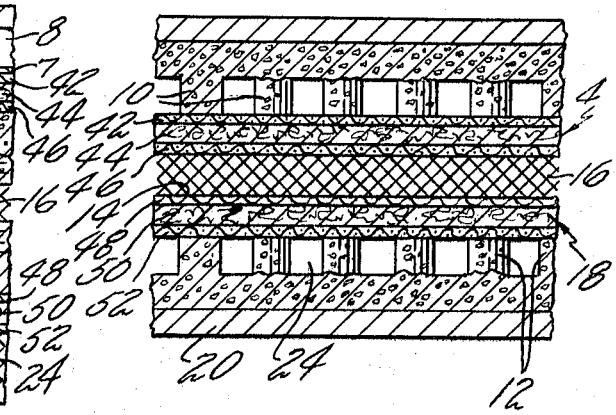
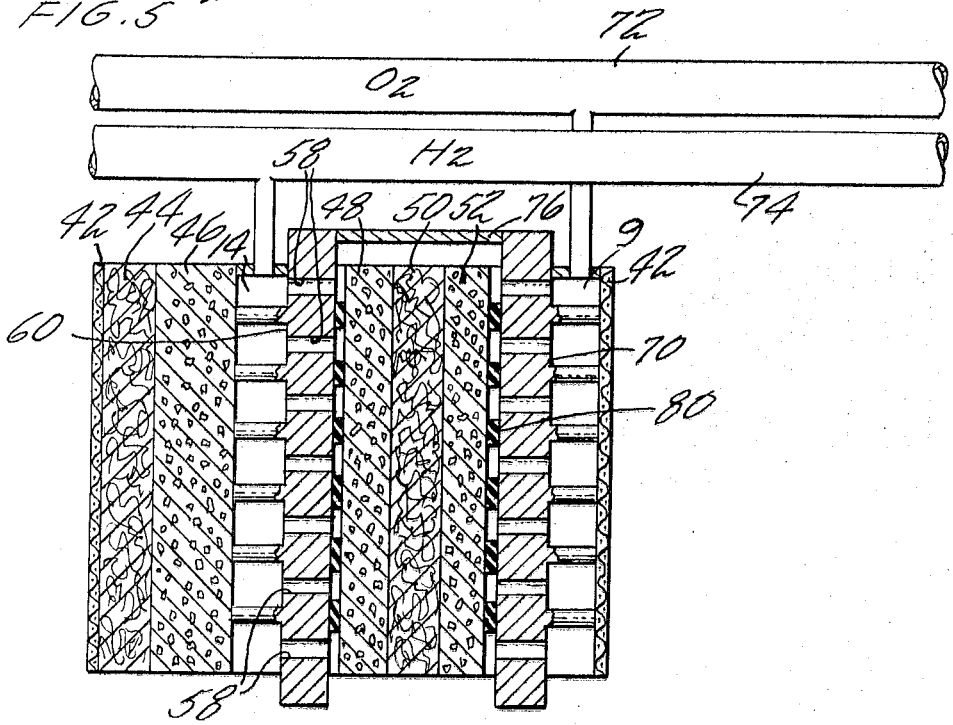

REGENERATIVE FUEL CELL

This is a continuation, of Ser. No. 51,902, filed July 2, 1970 now abandoned.

BACKGROUND OF THE INVENTION

1. Field of the Invention

This invention relates to regenerative fuel cells and particularly to a combined fuel cell and electrolysis cell unit.

2. Description of the Prior Art

Regenerative fuel cells are known in the art. One type of regenerative fuel cell known utilizes the same electrodes for the fuel cell during one mode of operation and for the electrolysis cell during the regeneration mode. While it is possible to perform both power generation and electrolysis with a single cell operating in a fuel cell mode at one time and in an electrolysis cell mode at another time, it is not advantageous to do so. Separating the fuel cell from the electrolysis cell permits independent optimization of the materials and configurations of each cell. Performance and durability are not as good if one cell is required to function in both modes. For example, fuel cell electrodes using a platinum catalyst have demonstrated excellent endurance and performance. However, if this type of electrode is used in an electrolysis cell, the high operating potential results in the formation of platinum oxide which reacts with the electrolyte to form soluble $PtO_3^=$ ions. Subsequent operation of this electrode in the fuel cell mode causes these ions to migrate to the hydrogen electrode where they are chemically reduced to platinum metal which forms platinum dendrites on the hydrogen electrode. This catalyst migration eventually causes low performance, and the platinum dendrites may cause gas evolution in the electrolyte cavity and subsequent failure of the cell.

Another type of regenerative cell known in the art physically separates the fuel cell from the electrolysis cell. This configuration requires ancillary equipment such as pressure vessels, valves, pumps, controls and interconnecting plumbing to accomplish storage and transfer of water and reactant gases, which makes the system less reliable, costly, and reduces the net electrical power of the fuel cell since some of the electrical energy generated by the fuel cell must be used to power the ancillary equipment.

Our invention obviates the disadvantages and drawbacks of the above-mentioned two types of regenerative fuel cells.

SUMMARY OF THE INVENTION

It is an object of the present invention to provide a regenerative fuel cell which is capable of being charged and discharged simultaneously.

It is another object of the present invention to provide a regenerative fuel cell in which the charge voltage is independent of the discharge voltage, i.e., the voltages can be the same or different from each other.

It is also an object of the present invention to provide a regenerative fuel cell which can be a completely hermetically sealed system, and one which is capable of substantially 100 percent depth of discharge and yet be fully rechargeable.

It is another object of the present invention to provide a regenerative fuel cell which has water transport means and reactant gas transport means which utilize no moving parts and are, therefore, static.

It is another object of the present invention to provide a regenerative fuel cell which has improved performance and a longer life than those regenerative fuel cells known in the art.

In accordance with the present invention a regenerative fuel cell which attains the above objects and others is provided by the combination of at least one fuel cell and one electrolysis cell disposed adjacent one another and spaced from each other by a hydrogen passage. Liquid storage matrices are disposed adjacent the fuel cell and the electrolysis cell for the storage, in a dilute electrolyte solution, of water produced during fuel cell operation. The water is converted into hydrogen and oxygen by electrolysis during the charging of the cell. The liquid storage matrices are provided with passages for the flow of gas therein. The oxygen producing electrode of the electrolysis cell and the oxygen consuming electrode of the fuel cell are in fluid communication with an oxygen storage compartment. The hydrogen producing electrode of the electrolysis cell and the hydrogen consuming electrode of the fuel cell are in fluid communication, through the hydrogen passage between the electrolysis cell and the fuel cell, with a hydrogen storage compartment.

During fuel cell operation hydrogen and oxygen are reacted in the fuel cell to generate electricity and form water. This water dilutes the fuel cell electrolyte and causes it to expand into the water storage matrices. As the concentration of fuel cell electrolyte declines, the equilibrium water vapor pressure over the electrolyte rises, thereby establishing a water vapor pressure gradient across the hydrogen passage between the fuel cell and the electrolysis cell. Product water vapor diffuses across the passage and tends to equalize the electrolyte concentration in the two cells, resulting in a transfer of water from the fuel cell to the electrolysis cell.

During electrolysis cell operation, water is consumed in the electrolysis cell, causing an increase in electrolyte concentration and a drop in the equilibrium water vapor pressure. The water vapor pressure gradient across the hydrogen passage is re-established, and water from the fuel cell is again transferred to the electrolysis cell.

Natural capillary and diffusion forces automatically control water storage and transport. In either the fuel cell or the electrolysis cell mode of operation, the rate of diffusion of water across the hydrogen passage is a function of the relative electrolyte concentration in the water storage matrices. This concentration difference is proportional to the rate of water production by the fuel cell or consumption by the electrolysis cell. The system automatically compensates for changes in power production or operating mode and needs no auxiliary controls or moving parts.

Other advantages of our regenerative fuel cell are: the cathode catalysts can be different, thereby allowing optimization for increased performance and life. For example, nickel can be used as the oxygen electrode catalyst in the electrolysis cell, while platinum can be used as the oxygen electrode catalyst in the fuel cell. The use of nickel for the electrolysis cell oxygen electrode is not only less expensive, but also gives a lower polarization voltage at the same current density than other catalysts known and obviates the catalyst migration problem, discussed heretofore, occurring when the same electrode is utilized for both the fuel cell and the electrolysis cell.

Separate electrolyte sources for the fuel cells and the electrolysis cells allow more fuel cells than electrolysis cells which is generally desirable i.e., there does not have to be a one-to-one ratio of fuel cells to electrolysis cells as in some regenerative fuel cells known in the art.

The foregoing and other objects, features and advantages of the present invention will become more apparent in the light of the following detailed description of a preferred embodiment thereof, as illustrated in the accompanying drawings.

DESCRIPTION OF THE DRAWINGS

FIG. 1 is a schematic illustration of an embodiment of a regenerative fuel cell system in accordance with the present invention.

FIG. 2 is a partial detailed view of the integrated fuel cell/electrolysis cell shown in FIG. 1.

FIG. 3 is a detailed view of another embodiment of the present invention.

FIG. 4 is a schematic illustration of another embodiment of regenerative fuel cell system in accordance with the present invention.

FIG. 5 is a partial detailed schematic view of the integrated fuel cell/electrolysis cell shown in FIG. 4.

DESCRIPTION OF THE PREFERRED EMBODIMENT

Referring to FIG. 1, there is shown a housing 2. A fuel cell stack 4 is radially disposed within the housing 2 and spaced from the outer wall 6 thereof by an electrically nonconductive corrugation 8, thereby forming an oxygen passage 9 between the fuel cell stack 4 and the wall 6. A first water storage matrix 10 is disposed adjacent the fuel cell stack 4. A second water storage matrix 12 is disposed adjacent the matrix 10 and spaced therefrom to provide a hydrogen passage 14 therebetween which has an electrically nonconductive screen 16 disposed therein. An electrolysis cell stack 18 is radially disposed adjacent the matrix 12 and spaced from a wall 20 by a screen 22, thereby forming an oxygen passage 24 between the electrolysis cell stack and the wall 20. Oxygen storage means 26 and 28 are provided in the ends of the housing 2 and are in fluid communication with the oxygen passages 9 and 24. Hydrogen storage means 30 is provided by the wall 20, the wall 32 and the wall 34 and is in fluid communication with the hydrogen passage 14. A gas seal 36 is provided to seal the hydrogen passage 14 from communication with the oxygen passages 9 and 24. The wall 32 is provided with an opening 38 into a bellows 40; this allows the hydrogen and oxygen pressures to be equalized at all times.

In FIG. 2, which is a detailed view of the integrated fuel cell stack/electrolysis cell stack shown in FIG. 1, like numerals refer to like components. The fuel cell stack 4 is shown having an oxygen electrode 42, an electrolyte storage matrix 44 and a hydrogen electrode 46. The electrolysis cell stack 18 is shown having a hydrogen electrode 48, and electrolyte storage matrix 50 and an oxygen electrode 52. The electrically nonconductive corrugation 8 preferably takes the form of corrugated metal, which provides good heat transfer from the fuel cell stack 4 to the wall 6 of the housing 2 for the rejection of waste heat, having a coating, or sheet, 7 of dielectric material, such as polytetrafluoroethylene, on its surface adjacent the fuel cell stack 4 to prevent conduction from the fuel cell to the wall 6. The water storage matricies are preferably constructed of porous metal such as nickel. The screens 16 and 22 are made from solid dielectric polymer materials such as polypropylene.

In operation, during fuel cell operation, hydrogen and oxygen are reacted in the fuel cell to generate electricity and form water. The water dilutes the fuel cell electrolyte in the electrolyte matrix 44 and causes the diluted electrolyte to expand into the water storage matrix 10. As the concentration of fuel cell electrolyte declines, the equilibrium water vapor pressure over the electrolyte rises, thereby establishing a water vapor pressure gradient across the hydrogen passage 14 between the fuel cell 4 and the electrolysis cell 18. Product water vapor diffuses across hydrogen passage 14 into water storage matrix 12 and tends to equalize the electrolyte concentration in the fuel cell and the electrolysis cell. This results in a transfer of water from the fuel cell and to the electrolysis cell. During electrolysis cell operation, water is consumed in the electrolysis cell 18, causing an increase in the electrolyte concentration in the electrolysis cell and a drop, therefore, in the equilibrium water vapor pressure. The water vapor pressure gradient across the hydrogen passage 14 is re-established, and water vapor from the fuel cell is again transferred to the electrolysis cell 18.

In FIG. 3, again, like numerals refer to like components. In this embodiment of our invention, the water storage matrix 10 is disposed between the fuel cell 4 and the wall 6, and the water storage matrix 12 is disposed between the electrolysis cell 18 and the wall 20. The operation of this embodiment is the same as that of the embodiment shown in FIG. 2 and described heretofore.

While only one fuel cell and one electrolysis cell have been shown in the description of the embodiments of our invention, it will be obvious to one skilled in the art, that more than one of each type of cell may be utilized in a system, and an advantage of our invention is that there need not be a one-to-one ratio of fuel cells to electrolysis cells. In other words, the number of electrolysis cells can, for example, be less than the number of fuel cells employed in a particular application.

FIG. 4, in which like numerals refer to like components, shows several fuel cells and electrolysis cells stacked axially within the housing 2.

FIG. 5 is a partial detailed schematic view of the integrated fuel cell/electrolysis cell combination shown in FIG. 4 in which like numbers refer to like components. The embodiment of FIG. 5 is essentially the same as the embodiments shown in FIGS. 2 and 3 except that during fuel cell operation, water is stored in the fuel cell hydrogen electrode 46 which is a sintered metal electrode in contradistinction to the screen type electrodes shown in FIGS. 2 and 3. As the amount of water increases therein the electrolyte concentration in the fuel cell decreases and water vapor diffuses across the hydrogen passage 14, through the holes 58 in the cooling plate 60, and to the electrolysis cell assembly where it is stored in the hydrogen electrode 48 and, the oxygen electrode 52 which are both porous metal electrodes. The oxygen conduit means 72 is in fluid connection with oxygen storage means 26, and the hydrogen conduit means 74 is in fluid connection with hydrogen storage means 30. The electrolysis cells and fuel cells are electrically insulated from the cooling plates 60 and 70 by insulating seals 80. The operation of this embodiment is the same as that described heretofore for our other embodiments.

There has thus been described preferred embodiments of a regenerative fuel cell system in accordance with the present invention. While various systems are shown in which our invention is utilized, it will be understood by those skilled in the art that the advantages of our invention integrated fuel cell and electrolysis cell with our inventive mode of water transport and storage can be realized in many system arrangements. Therefore it should be understood by those skilled in the art that various changes and omissions in the form and detail thereof may be made therein without departing from the spirit and scope of the invention.

What we claim as new and desire to secure by Letters Patent of the United States is:

1. A regenerative fuel cell system which operates on hydrogen and oxygen, comprising:
    a housing;
    a first assembly disposed in said housing including a fuel cell having a hydrogen electrode, a first oxygen electrode and an electrolyte matrix disposed therebetween, and including a first oxygen passage, at least one of said electrodes having a first water storage matrix associated therewith, said first oxygen electrode being composed of a first material;
    a second assembly disposed in said housing including an electrolysis cell having a hydrogen electrode, a second oxygen electrode and an electrolyte matrix disposed therebetween, and including a second oxygen passage, at least one of said electrolysis cell electrodes having a second water storage matrix associated therewith, said second assembly disposed adjacent to said first assembly and spaced therefrom forming a hydrogen passage therebetween in fluid communication with said first and second water storage matrices, said second oxygen electrode being composed of a second material different from said first material;
    fluid connecting means in communication with said hydrogen passage and said oxygen passages for providing hydrogen to said hydrogen passage and oxygen to said oxygen passages, and including seal means preventing said hydrogen passage from communicating with said oxygen passages; and
    means for operating said first assembly always as a fuel cell and said second assembly always as an electrolysis cell, said means being in electrical communication with said assemblies.

2. A regenerative fuel cell system as defined in claim 1, wherein said water storage matrix of said first assembly is disposed adjacent said fuel cell hydrogen electrode and wherein the water storage matrix of said second assembly is disposed adjacent the electrolysis cell hydrogen electrode.

3. A regenerative fuel cell system as defined in claim 1, wherein said water storage matrix of said first assembly is disposed adjacent said fuel cell oxygen electrode and wherein said water storage matrix of said second assembly is disposed adjacent said electrolysis cell oxygen electrode.

4. A regenerative fuel cell system as defined in claim 1, wherein said first assembly and said second assembly are disposed radially within said housing, said housing including an outer wall, said first assembly being disposed adjacent the outer wall of said housing and separated therefrom by electrically nonconductive heat transfer means.

5. A regenerative fuel cell system as defined in claim 1, wherein said first assembly and said second assembly are disposed axially within said housing.

6. A regenerative fuel cell system as defined in claim 4, including hydrogen storage means and oxygen storage means disposed within said housing and in communication with said fluid connecting means.

7. A regenerative fuel cell system as defined in claim 5, including hydrogen storage means and oxygen storage means disposed within said housing and in communication with said fluid connecting means.

8. A regenerative fuel cell system as defined in claim 1, wherein said water storage matrix of said first assembly is disposed between said fuel cell hydrogen electrode and said hydrogen passage.

9. A regenerative fuel cell system as defined in claim 1, wherein said water storage matrix of said second assembly is disposed between said electrolysis cell hydrogen electrode and said hydrogen passage.

10. A regenerative fuel cell system as defined in claim 1, wherein said first water storage matrix of said first assembly is at least one of said fuel cell electrodes and wherein said second water storage matrix of said second assembly is at least one of said electrolysis cell electrodes.

11. The regenerative fuel cell system according to claim 1 wherein at least one of said water storage matrices is one of said electrodes.

12. A regenerative fuel cell system which operates on hydrogen and oxygen, comprising:
    a housing
    a first assembly disposed in said housing including a fuel cell having a hydrogen electrode, a first oxygen electrode and an electrolyte matrix disposed therebetween, and including a first oxygen passage, at least one of said electrodes being porous for storing water therein, said first oxygen electrode being composed of a first material;
    a second assembly disposed in said housing including an electrolysis cell having a hydrogen electrode, an oxygen electrode and an electrolyte matrix disposed therebetween, and including a second oxygen passage, at least one of said second assembly electrodes being porous for storing water therein, said second assembly disposed adjacent said first assembly and spaced therefrom forming a hydrogen passage in fluid communication with said fuel cell porous electrode and said electrolysis cell porous electrode, said second oxygen electrode being composed of a material different from said first material;
    fluid connecting means for supplying hydrogen to said hydrogen passage and oxygen to said oxygen passages and including seal means separating said hydrogen passage from said oxygen passages; and
    means for operating said first assembly always as a fuel cell and said second assembly always as an electrolysis cell, said means being in electrical communication with said assemblies.

* * * * *